(12) United States Patent
Gonzalez et al.

(10) Patent No.: US 7,450,709 B2
(45) Date of Patent: *Nov. 11, 2008

(54) CALLING PARTY RINGTONE SELECTION IN TELEPHONE SYSTEM

(75) Inventors: Valois B. Gonzalez, Marietta, GA (US); Douglas Alston, Fayetteville, GA (US)

(73) Assignee: AT&T Intellectual Property I. L.P., Reno, NV (US)

( * ) Notice: Subject to any disclaimer, the term of this patent is extended or adjusted under 35 U.S.C. 154(b) by 69 days.

This patent is subject to a terminal disclaimer.

(21) Appl. No.: 11/129,873

(22) Filed: May 16, 2005

(65) Prior Publication Data

US 2005/0207556 A1 Sep. 22, 2005

Related U.S. Application Data

(63) Continuation of application No. 10/281,759, filed on Oct. 28, 2002, now Pat. No. 6,901,139.

(51) Int. Cl.
*H04M 3/42* (2006.01)
*H04M 3/00* (2006.01)
(52) U.S. Cl. .............................. 379/207.16; 379/373.01
(58) Field of Classification Search ............ 379/207.02, 379/207.11, 207.13, 207.15, 207.16, 142.01, 379/142.06, 373.01–373.03
See application file for complete search history.

(56) References Cited

U.S. PATENT DOCUMENTS

| | | | |
|---|---|---|---|
| 6,031,899 A * | 2/2000 | Wu ........................ 379/142.01 |
| 6,370,233 B1 * | 4/2002 | Bennett et al. ................. 379/37 |
| 6,400,808 B1 * | 6/2002 | Burg ........................ 379/88.21 |
| 6,516,057 B2 * | 2/2003 | Meek et al. .................. 379/196 |
| 6,650,746 B1 * | 11/2003 | Groen et al. ........... 379/207.16 |
| 6,697,473 B2 * | 2/2004 | Batten ........................ 379/199 |
| 7,082,190 B2 * | 7/2006 | Simpson et al. ............ 379/67.1 |
| 7,170,883 B2 * | 1/2007 | Harris et al. ................. 370/349 |
| 2003/0123631 A1 * | 7/2003 | Moss et al. ............ 379/210.02 |
| 2004/0109558 A1 * | 6/2004 | Koch ..................... 379/373.01 |
| 2004/0213401 A1 * | 10/2004 | Aupperle et al. ............ 379/372 |
| 2005/0180554 A1 | 8/2005 | Alston |

* cited by examiner

*Primary Examiner*—William J Deane
(74) *Attorney, Agent, or Firm*—Withers & Keys, LLC

(57) ABSTRACT

A ringtone system is provided to a called party that wishes to have a particular ringtone annunciated for each of several types of calls from calling parties. In the ringtone system, for a call from a calling party, the calling party is prompted to identify the type of the call. The type of the call is received from the calling party, and if no type is received, the call is typed in a particular manner. A list of types of calls with respect to and as specified by the called party is maintained, where each type of call on the list has a corresponding ringtone specified therefor. The typed call is processed by determining from the list of types of calls for the called party the corresponding ringtone specified for the typed call, and by putting the call through to the called party with the determined ringtone.

18 Claims, 3 Drawing Sheets

CALLING PARTY RINGTONE SELECTION IN TELEPHONE SYSTEM

CROSS-REFERENCE TO RELATED CASES

The present application is a continuation of U.S. patent application Ser. No. 10/281,759, filed Oct. 28, 2002 now U.S. Pat. No. 6,901,139, hereby incorporated by reference in its entirety.

FIELD OF THE INVENTION

The present invention relates to a telephone system where a calling party can select a ringtone to be played at a telephone or the like of a called party. More particularly, the present invention relates to a telephone service enabled by the called party to allow the calling party to select a ringtone to be played.

BACKGROUND OF THE INVENTION

In recent years, a number of new telephone service features have been provided by an Advanced Intelligent Network (AIN). The AIN evolved out of a need to increase the capabilities of the telephone network architecture in order to meet the growing needs of telephone customers or users. Additionally, as the number of people who rely on the Internet for communication increases, so does the demand for the electronic transfer of data.

Referring now to FIG. 1, it is seen that an AIN-based network arrangement is provided within and/or in conjunction with each of several wire line telephone system LATAs (Local Access and Transport Area) 101, each of which defines a calling service area. Note that a similar arrangement is also provided with and/or in conjunction with a wireless telephone system. Each LATA 101 (only one being shown in FIG. 1) includes stations (i.e. telephone lines and telephone equipment at the ends thereof) 103 and corresponding service switching points (SSPs) 105 at end offices or central offices. The SSPs 105 are each programmable switches which: recognize AIN-type calls; launch queries to service control points (SCPs) 107 (only one being shown in FIG. 1); and receive commands and data from SCPs 107 to further process and route AIN-type calls within and between the LATAs 101. A signal transfer point (STP) 109 may be employed to route signals between the SSPs 105, the SCPs 107, and other network elements. When one of the SSPs 105 is triggered by an AIN-type call, the triggered SSP 105 formulates an AIN service request for a particular AIN element such as an SCP 107, sends the request to the element, receives a response including call processing instructions from the element, and acts in accordance with the received call processing instructions.

An AIN trigger may be associated with a called party and an SSP 105 thereof or a called party and an SSP 105 thereof. One type of event that may be arranged to set off an AIN trigger in an SSP 105 or the like is a call from a calling party to a called party where the called party has arranged for a telephone service to be performed prior to having the call put through. Here, the trigger is associated with the SSP 105 of the called party, and the service may be any sort of service, such as for example a service to check first to see if the line of the called party is busy, and if so to forward the call to an alternate number or an answering service.

Typically, a call when put through to a called party causes a signal to be annunciated (a ringtone to be played, e.g.) at the telephone or the like of the called party, whereby the signal/ringtone (hereinafter, 'ringtone') alerts the called party to the call and the called party may answer same. In the case of a wire line telephone system, the ringtone is typically generated by the end office or central office associated with the called party, and in the case of a wireless telephone system, the ringtone is typically generated at the telephone or the like in response to a ringtone generation command from a switching center or the like. Typically, the ringtone played is always the same ringtone regardless of the nature of the telephone call, even when the called party can select the ringtone.

When a calling party calls a called party, then, the called party is presented with the same ringtone regardless of whether the call is routine, special, urgent, an emergency, or the like. As should be appreciated, however, the called party may instead wish to be presented with a different ringtone for each of several types of calls, so that the called party may have an opportunity to decide to answer each call based on the nature of the call as represented by the ringtone presented for such call.

Accordingly, a need exists for a method and mechanism by which the called party can in fact be provided with a different ringtone for each of several types of calls, and may indeed have an opportunity to decide to answer each call based on the nature of the call as represented by the ringtone presented for such call. More particularly, a need exists for such a method and mechanism by which the calling party is given an opportunity to specify a type for the call, and based on the type specified a particular ringtone is presented to the called party.

SUMMARY OF THE INVENTION

The present invention satisfies the aforementioned need by providing a ringtone system implemented as a ringtone service to a called party by a telephone service provider of the called party. The called party wishes to have a particular ringtone annunciated for each of several types of calls from calling parties and subscribes to the ringtone service as provided by the telephone service provider. The ringtone service determines the type of each call and annunciates the corresponding ringtone to the called party.

In the ringtone system, for a call from a calling party, the calling party is prompted to identify the type of the call. The type of the call is received from the calling party, and if no type is received, the call is typed in a particular manner. A list of types of calls with respect to and as specified by the called party is maintained, where each type of call on the list has a corresponding ringtone specified therefor. The typed call is processed by determining from the list of types of calls for the called party the corresponding ringtone specified for the typed call, and by putting the call through to the called party with the determined ringtone.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
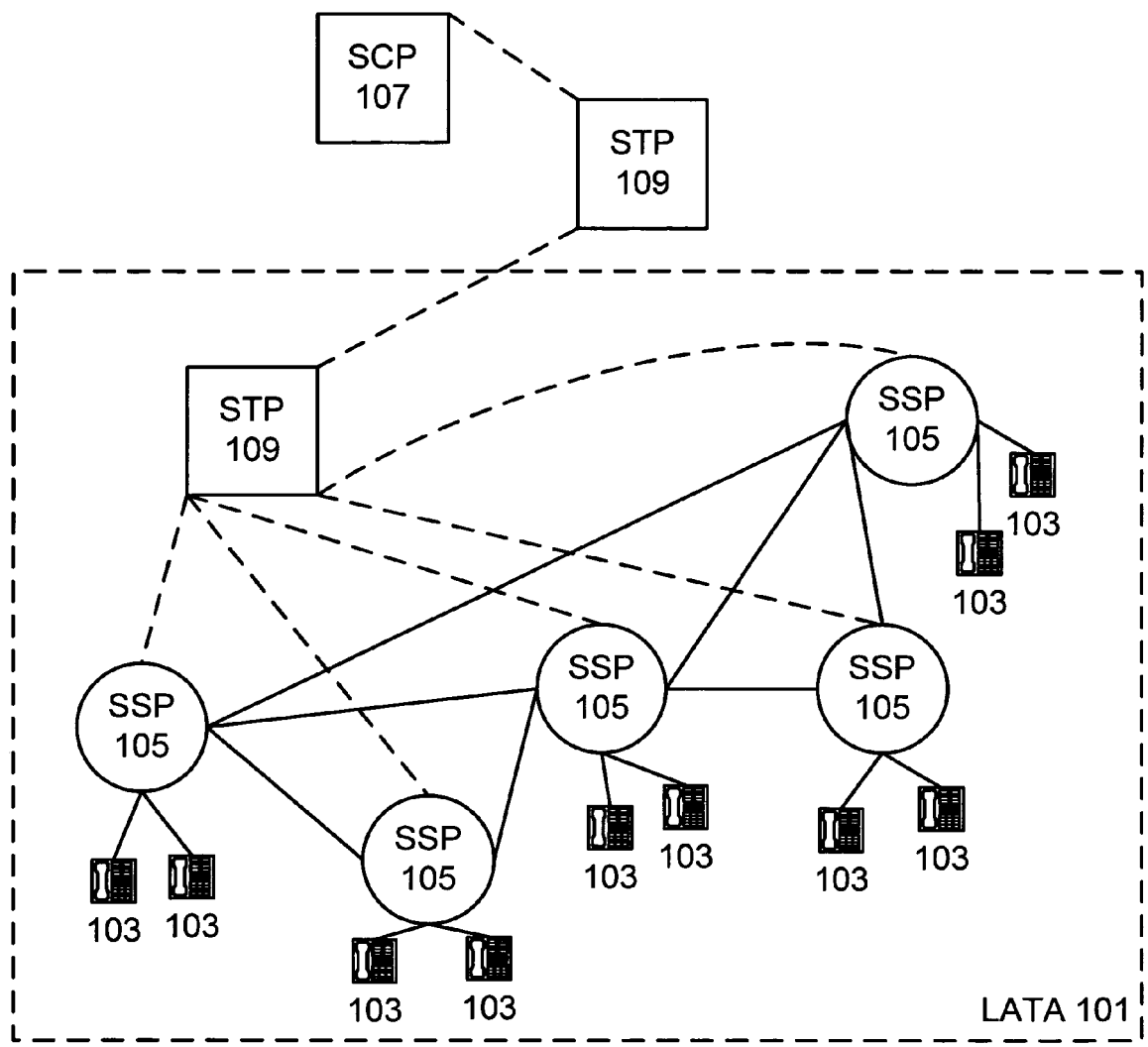
FIG. 1 is a block diagram showing a typical AIN-based telephone network such as may be employed in connection with the present invention.
Figure 2:
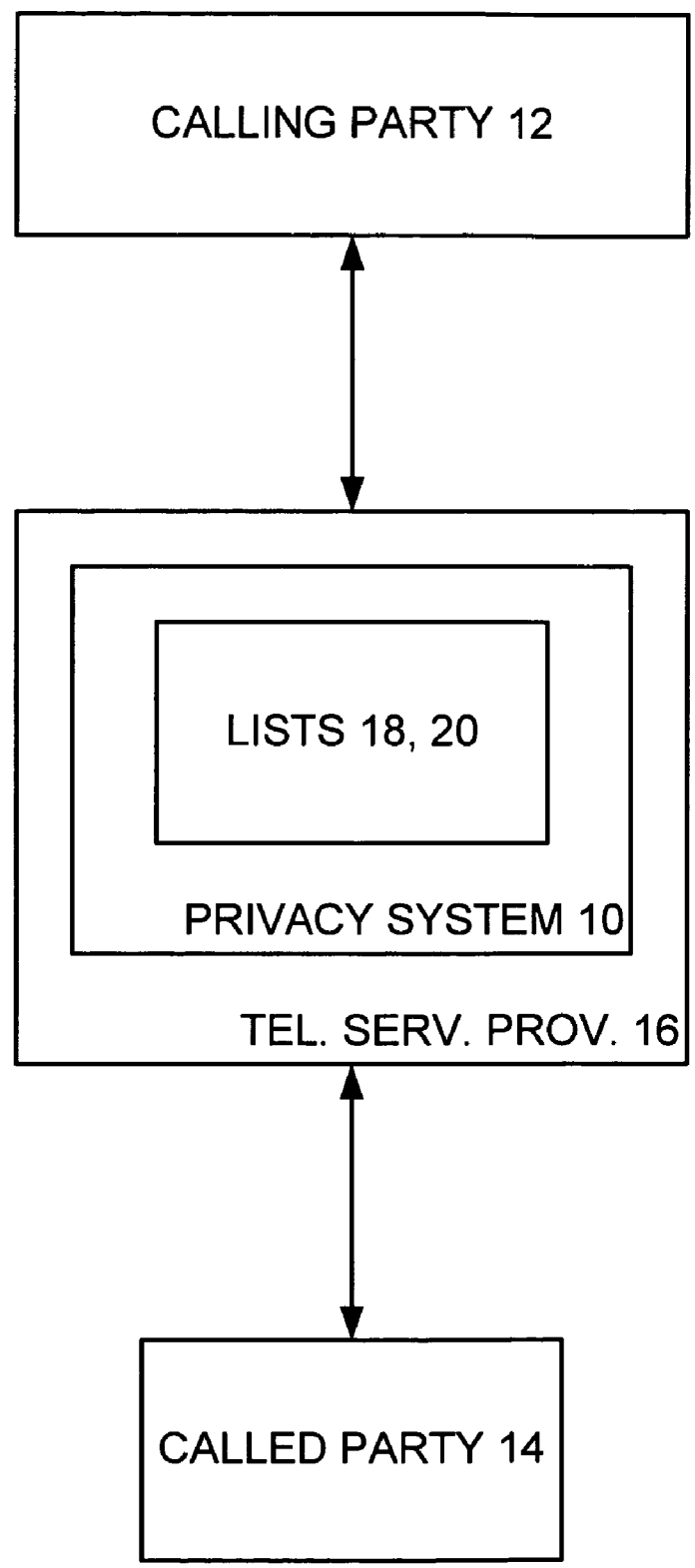
FIG. 2 is a block diagram showing a calling party calling a called party by way of a telephone service provider of the called party, where the called party subscribes to a ringtone system in accordance with one embodiment of the present invention.

Referring to the drawings in detail, wherein like numerals are used to indicate like elements throughout, there is shown in FIG. 2 a ringtone system 10 for providing a ringtone service that identifies each of several different types of calls to a called party 12 from any calling party 14 by presenting a particular ringtone or other annunciation to the called party based on the type of call. Typically, the ringtone system 10 is implemented as a service to the called party 14 by the telephone service provider 16 of the called party 14, and is at least partially implemented at an SSP 105 or central office administered by the telephone service provider 16. The ringtone system 10 may be AIN-based or non-AIN based without departing from the spirit and scope of the present invention.

Notably, and as mentioned above, a ringtone is merely one category of annunciation that may be employed. In fact, any other category of annunciation may also be employed without departing from the spirit and scope of the present invention. For example, the annunciation may be any sort of sound including bells, whistles, spoken material, etc., any sort of visual presentation including lights of one or more colors and or sequences, etc., or the like. Significantly, the annunciation or ringtone, whatever it may be (hereinafter, 'ringtone'), has the effect of alerting the called party to the call and the called party may thereby decide to answer same.

Also notably, and as also mentioned above, the ringtone may be generated by at an end office/central office/switching center or the like or may be generated at the telephone or the like in response to a ringtone generation command from an end office/central office/switching center or the like without departing from the spirit and scope of the present invention.

In one embodiment of the present invention, when a calling party 12 calls a called party 14, the ringtone system 10 determines what type the call may be classified as and based on the type of call presents the called party 14 with a ringtone corresponding to such type of call. Note that each type of call may be any type of call without departing from the spirit and scope of the present invention, and may be defined by the called party 14 and/or the ringtone system 10. For example, the types of calls may include normal calls, urgent calls, emergency calls, non-urgent calls, calls from relatives and/or friends, calls from business associates, calls from strangers, calls from telemarketers, calls from solicitors, and the like.

Correspondingly, each corresponding ringtone may be any appropriate ringtone without departing from the spirit and scope of the present invention, and may be defined by the called party 14 and/or the ringtone system 10. For example, the ringtone for a normal call may be a normal trill or warble, while the ringtone for an emergency or urgent call may be an extended trill and the ringtone for a non-emergency or non-urgent call may be a shortened trill. Similarly, the ringtone for calls from relatives and/or friends and/or business associates may include a crescendo sound while the ringtone for calls from strangers, telemarketers, solicitors, and the like may include a doom sound. Accordingly, and based on the ringtone presented with a particular call, the called party 14 may have an opportunity to decide to answer the call based on the type of the call as represented by the ringtone presented for such call.

In the case where the called party 14 defines the ringtone for each type of call, such called party 14 may so define and modify the ringtones in any appropriate manner without departing from the spirit and scope of the present invention. For example, each called party 14 may define or have defined therefor a corresponding list 18 of the ringtones and corresponding types of calls by way of a computer connected to the ringtone system 10 over a network such as the Internet (not shown), or may define the list 18 by accessing the ringtone system 10 over the telephone network by way of a specified telephone number. Likewise, the ringtones themselves may be defined by the called party 14 and/or may be selected by the called party 14 from pre-defined ringtones established by the telephone service provider 16 and/or the ringtone system 10.

In one embodiment of the present invention, ringtone system 10 itself determines the type of a particular call, at least in some instances. For example, the ringtone system 10 may determine from available information that a call is coming from a doctor, a hospital, a police station, or the like, and automatically identify the call as an emergency call. Similarly, the ringtone system 10 may determine from available information that a call is coming in from a long distance during the dinner hour from behind a private switch and automatically identify the call as coming from a stranger, a solicitor, or a telemarketer.

In one embodiment of the present invention, the ringtone system 10 determines that a call is from a calling party 12 previously identified by the called party 14 as being a friend or acquaintance, and automatically identifies the call as coming therefrom. To enable such a situation, it may be that each called party 14 can define a corresponding list 20 of privileged calling parties 12, again by way of a computer connected to the ringtone system 10 over a network such as the Internet (not shown), or by accessing the ringtone system 10 over the telephone network by way of a specified telephone number.

Such list 20 may be based on the telephone number or telephone numbers of each privileged calling party 12, and may specify a type of call for the privileged calling party 12. Alternatively, being on the list 20 may in itself type the call in a particular manner. Thus, the telephone number of the calling party 12 as presented to the telephone service provider 16 of the called party 14 may be forwarded to the ringtone system 10 and compared to the list 20 of the called party 14 to determine whether the calling party 12 has been specified by the called party 12 as being privileged, and if so a corresponding ringtone may be presented to the called party. Of course, the list 20 may be based on indicia other than the telephone number of the calling party 12 without departing from the spirit and scope of the present invention.

In the instance where the ringtone system 10 cannot or does not determine a particular type of a call from a calling party 12, the ringtone system 10 may prompt the calling party 12 to identify such a type, perhaps by an audio prompt, and the calling party 12 may identify the type of the call, perhaps by keying in a menu selection on a telephone keypad. Notably, if the calling party 14 refuses to identify a type for the call, the ringtone system 10 may choose to type the call in a predetermined manner, such as of a low priority, or may choose to refuse to put the call through. As may be appreciated, such handling may be defined by the calling party 14.

Figure 3:
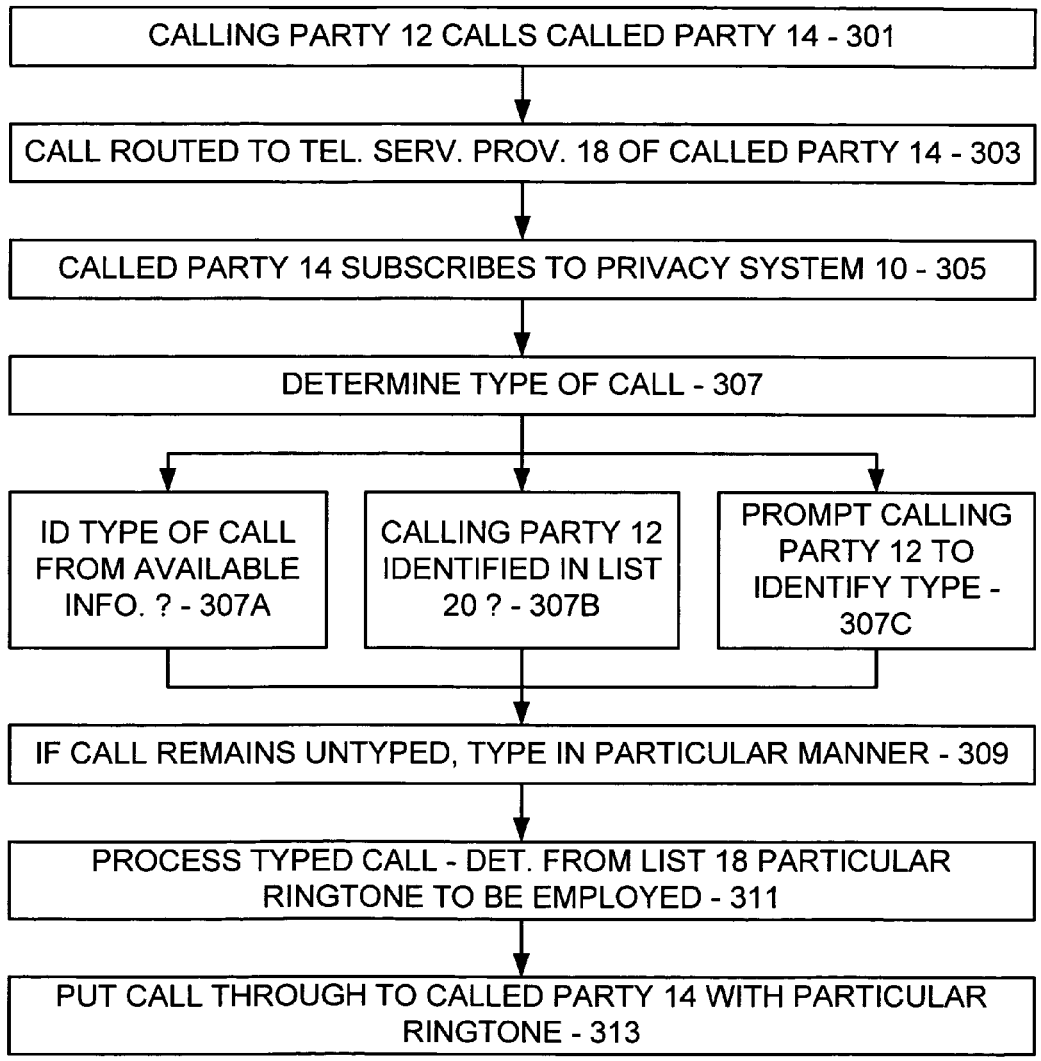
FIG. 3 is a flow diagram showing steps performed in connection with the call from the calling party to the called party of FIG. 2.

In one embodiment of the present invention, and referring now to FIG. 3, a method for processing a call from a calling party 12 to a called party 14 by way of the ringtone system 10 and the list 20 is as follows:

The process begins when a calling party 12 places a call to a called party 14 at a telephone service provider 16, where the called party 14 subscribes to the ringtone system 10 and may maintain the lists 18 and/or 20 such as were set forth above (step 301). In the normal course, the call is routed to the telephone service provider 18 of the called party 14 (step 303), where it is noted by way of a trigger or the like that the called party 14 subscribes to the ringtone system 10 (step 305). Accordingly, and in accordance with the ringtone system 10, the call is examined to determine a type therefor (step 307).

In particular, the ringtone system 10 may determine whether the type of the call can be identified by from available information (step 307a). If so, the typed call is processed, and if not, the ringtone system 10 determines whether the call is from a calling party 12 previously identified by the called party 14 in the list 20 for such called party 14 (step 307b). If so, the call is typed according to the calling party 12 being on the list 20 and is processed, and if not, the ringtone system 10 prompts the calling party 12 to identify such a type, perhaps by an audio prompt (step 307c). If the calling party 12 identifies the type of the call, perhaps by keying in a menu selection on a telephone keypad, the typed call is processed, and if not, the ringtone system 10 un-typed call is processed by being typed in a particular manner, such as for example of a low priority, or by being terminated (step 309).

In any event, once the ringtone system 10 types a call, the typed call is processed by determining from the list 18 for the called party 14 a particular ringtone to be employed to annunciate the call to the called party 14 by way of a telephone or the like thereof (step 311). Thereafter, the ringtone system 10 puts the call through to the called party 14 with the particular ringtone (step 313). In the case where the ringtone is generated by the end office, central office, switching center, or the like associated with the called party 14, the ringtone system 10 sends a ringtone generation command to such end office, central office, switching center, or the like to generate the ringtone, and in the case where the ringtone is generated at the telephone or the like, the ringtone system 10 sends the ringtone generation command to the telephone of the called party 14 by way of such end office, central office, switching center, or the like. In either instance, the receiver of the generation command should be configured to understand and obey the command.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism by which the called party 14 subscribing to the ringtone system 10 or service can identify privileged calling parties 12 that are not required to be screened by the privacy service 10. More particularly, the present invention comprises a new and useful ringtone system 10 and method by which a called party 14 can be provided with a different ringtone for each of several types of calls, and therefore has an opportunity to decide to answer each call based on the nature of the call as represented by the ringtone presented for such call. The calling party 12 is wither typed or is given an opportunity to specify a type for the call, and based on the type a particular ringtone is presented to the called party 14. It should be appreciated that changes could be made to the embodiments described above without departing from the inventive concepts thereof. Notably, the present invention is equally applicable to wire line and wireless telephone systems. It should be understood, therefore, that this invention is not limited to the particular embodiments disclosed, but it is intended to cover modifications within the spirit and scope of the present invention as defined by the appended claims.

The invention claimed is:

1. A method for presenting an annunciation to a called party, the method comprising:
   determining by a ringtone system a type of call from a calling party based on information available with the call at the time of initial connection and by referring to information available to the ringtone system other than information specified by the called party;
   for calls where the type of the call cannot be determined based on the information available with the call at the time of initial connection, prompting the calling party to provide information identifying the type of the call, receiving such identifying information from the calling party, and determining the type of the call from the identifying information;
   determining a particular annunciation to be presented to the called party based on the determined type of the call; and
   putting the annunciation through together with the call to the called party.

2. The method of claim 1, wherein the annunciation is a ringtone.

3. The method of claim 1, wherein the particular annunciation is determined from a list of types of calls including, for each type of call, a corresponding annunciation to be presented to the called party.

4. The method of claim 3, further comprising determining whether the calling party is on a list of privileged calling parties, and if so typing the call according to the calling party being on the list of privileged calling parties.

5. The method of claim 3, wherein the list of types of calls is defined by the called party.

6. The method of claim 1, wherein the calling party is prompted by way of an audio prompt to identify the type of the call, and the identifying information identifying the type of the call is received from the calling party by way of a menu selection.

7. The method of claim 1, wherein receiving the identifying information from the calling party comprises receiving identifying information from which no type can be determined.

8. The method of claim 7, wherein if a call is one for which no type can be determined, typing the call as being one of low priority and terminating the call.

9. The method of claim 1, wherein for calls where the type of the call cannot be determined based on the information available with the call at the time of initial connection by referring to information available to the annunciation system other than information provided by the called party, determining the type of the call based on the information available with the call at the time of initial connection by referring to information available to the annunciation system that has been provided by the called party.

10. The method of claim 1, further comprising receiving from the called party a set of annunciations defined by the called party and wherein determining the particular annunciation to be presented comprises selecting an annunciation from the set.

11. A computer-readable medium having stored thereon computer-executable instructions for implementing a method for presenting an annunciation to a called party, the method comprising:

determining by a ringtone system a type of call from a calling party based on information available with the call and by referring to information available to the ringtone system other than information specified by the called party;

for the calls where the type of call cannot be determined based on the information available with the call at the time of initial connection, prompting the calling party to provide information identifying the type of the call, receiving such identifying information from the calling party, and determining the type of the call from the identifying information;

determining a particular annunciation to be presented to the called party based on the determined type of call; and putting the annunciation through together with the call to the called party.

12. The medium of claim 11, wherein the annunciation is a ringtone.

13. The medium of claim 11, wherein the particular annunciation is determined from a list of types of calls including, for each type of call, a corresponding annunciation to be presented to the called party.

14. The medium of claim 13, wherein the list of types of calls is defined by the called party.

15. The medium of claim 13, further having stored thereon instructions for:

determining whether a calling party is on a list of privileged calling parties; and if the party is on a list of privileged calling parties, typing the call according to the calling party being on the list of privileged calling parties.

16. The medium of claim 11, wherein the calling party is prompted by way of an audio prompt to identify the type of the call, and the identifying information identifying the type of the call is received from the calling party by way of a menu selection.

17. The medium of claim 11, wherein receiving the identifying information from the calling party comprises receiving identifying information from which no type can be determined.

18. The medium of claim 17, further having stored thereon instructions for typing the call for which no type can be determined.

* * * * *